UNITED STATES PATENT OFFICE.

JESSE W. SNYDER, OF CHICAGO, ILLINOIS, ASSIGNOR OF ONE-HALF OF HIS RIGHT TO THOS. H. MARTIN, OF SAME PLACE.

IMPROVEMENT IN THE MANUFACTURE OF ARTIFICIAL STONE.

Specification forming part of Letters Patent No. 129,689, dated July 23, 1872.

*To whom it may concern:*

Be it known that I, JESSE W. SNYDER, of Chicago, in the county of Cook and State of Illinois, have invented a new and useful Improvement in the Manufacture of Artificial Stone; and I do declare that the following is a true and accurate description thereof.

Take of Hamburg or other cement one (1) part; sharp clean sand two, (2,) three, (3,) or four (4) parts, and mix them thoroughly together. Then take of bullock's blood one (1) barrel; water, two (2) barrels; and of magnesia two (2) pounds, and thoroughly mix them together. Then to a quantity of the sand and cement I add sufficient of the fluid mixture to moisten the mass, which I tamp into the molds, which give it the desired form. The mass should remain twenty-four hours in the molds to dry and set; then remove them and pour over the molded blocks as much of the above solution as they will absorb, and repeat it daily for five days, when they are ready for use.

The artificial stone made by this process is insoluble in water; on the contrary it hardens when immersed in water or when exposed to the weather.

What I claim as my invention, and desire to secure by Letters Patent, is—

Artificial stone composed of the materials and in the proportions substantially as herein set forth.

JESSE W. SNYDER.

Witnesses:
  WM. H. LOTZ,
  GEO. FERRIS.